United States Patent [19]
Fatehi et al.

[11] Patent Number: 6,067,389
[45] Date of Patent: May 23, 2000

[54] WAVELENGTH-SELECTIVE OPTICAL CROSS-CONNECT

[75] Inventors: Mohammad Taghi Fatehi, Middletown; Wayne Harvey Knox, Holmdel, both of N.J.

[73] Assignee: Lucent Technologies Inc., Murray Hill, N.J.

[21] Appl. No.: 09/123,085

[22] Filed: Jul. 27, 1998

[51] Int. Cl.$^7$ .................................................. G02B 6/26
[52] U.S. Cl. ............................. 385/17; 385/24; 385/37; 385/46
[58] Field of Search .................. 385/17, 15–24, 385/37, 46; 359/117, 124, 128, 121, 130

[56] References Cited

U.S. PATENT DOCUMENTS

| | | | |
|---|---|---|---|
| 5,181,134 | 1/1993 | Fatehi et al. | 359/117 |
| 5,446,809 | 8/1995 | Fritz et al. | 385/17 |
| 5,570,218 | 10/1996 | Sotom | 385/17 X |
| 5,627,925 | 5/1997 | Alferness et al. | 385/17 |
| 5,712,932 | 1/1998 | Alexander et al. | 385/24 |

OTHER PUBLICATIONS

Jorg Hubner et al., "Strong Bragg Gratings in Non Sensitized Low Loss Planar Waveguides as Building Blocks for WDM Network Components", SPIE, vol. 2998, No. 12, Photonics West 97, San Jose, CA 1997, pp. 1–11.

*Primary Examiner*—Phan T. H. Palmer
*Attorney, Agent, or Firm*—Gregory J. Murgia

[57] ABSTRACT

An optical switch includes an optical router portion for distributing multi-wavelength optical signals received at input ports of the switch, an optical combiner portion for supplying multi-wavelength signals at the output ports of the switch, and optical fibers for interconnecting the optical router portion and optical combiner portion. Selected ones of the interconnecting optical fibers include wavelength-selective elements, such as fiber gratings, which are capable of transmitting or reflecting individual channels within the multi-wavelength optical signal so that a selected channel of a particular wavelength can be routed from any of the input ports to any of the output ports of the switch. In one exemplary embodiment, the optical router portion includes a plurality of input optical couplers, wherein each input optical coupler is associated with a corresponding input port of the optical switch. Similarly, the optical combiner portion includes a plurality of output optical couplers, wherein each output optical coupler is associated with a corresponding output port of the optical switch. Each input optical coupler together with its associated fiber gratings on the interconnecting optical fibers is used for distributing the signals received via the input ports while each output optical coupler together with its associated fiber gratings is used for combining the signals to be supplied at the output ports of the switch.

16 Claims, 5 Drawing Sheets

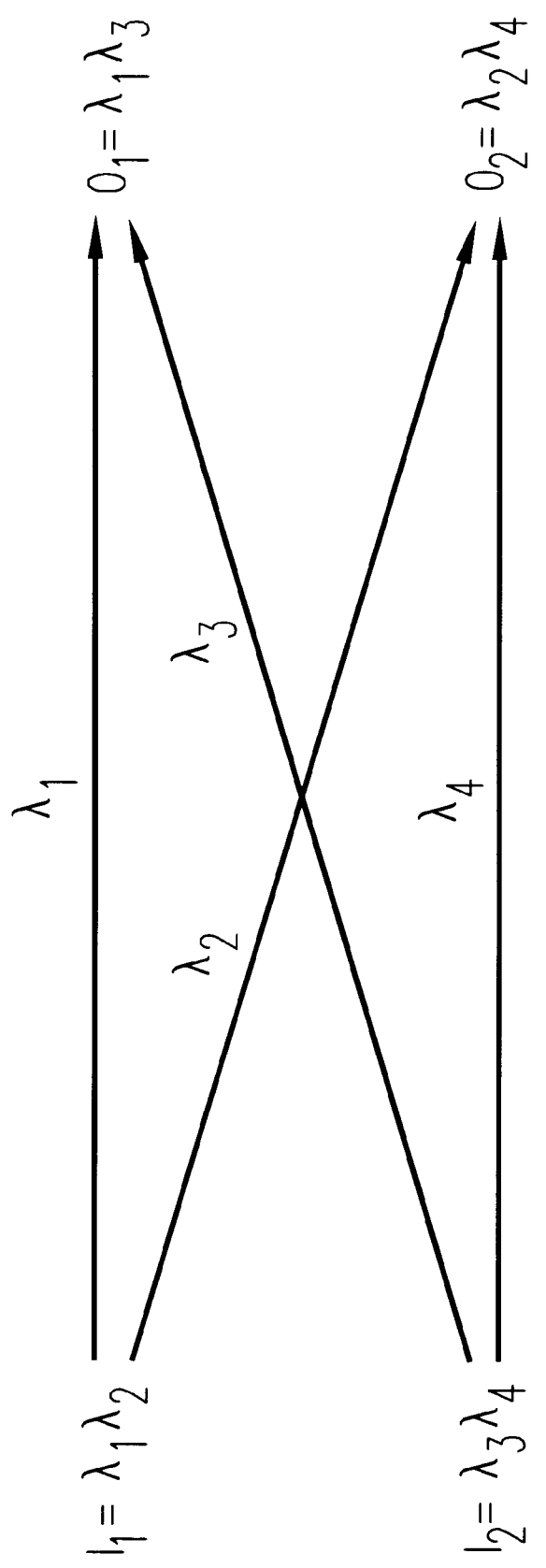

6,067,389

WAVELENGTH-SELECTIVE OPTICAL CROSS-CONNECT

FIELD OF THE INVENTION

This invention relates generally to lightwave communication networks and, more particularly, to optical cross-connect arrangements for routing multi-wavelength optical signals.

BACKGROUND OF THE INVENTION

Optical fiber is generally preferred as the transmission medium for communication networks because of the speed and bandwidth advantages associated with optical transmission. Wavelength division multiplexing (WDM), which combines many optical signals at different wavelengths for transmission in a single optical fiber, is being used to meet the increasing demands for more speed and bandwidth in optical transmission applications.

In communication networks, such as those employing WDM, individual optical signals may need to be selectively routed to different destinations. As is well known, a necessary component for selectively routing signals through interconnected nodes in a communication network is a high capacity matrix or cross-connect switch. At present, most cross-connect switches used in optical communication networks are either manual or electronic which require multiple optical-to-electrical and electrical-to-optical conversions. However, because of the speed and bandwidth advantages associated with transmitting information in optical form, all-optical network elements are emerging as the preferred solutions for WDM-based optical networks. Moreover, all-optical network elements are needed to provide the flexibility for managing bandwidth at the optical layer (e.g., on a wavelength by wavelength basis).

Although efforts have been made to develop all-optical cross-connects and switches, these efforts have not kept pace with the ever increasing demands for more speed and bandwidth. For example, some cross-connect arrangements have contemplated a combination of lithium niobate (LiNbO$_3$) switch arrays with fiber amplifiers to address the speed and loss problems of prior systems. Although lithium niobate switch arrays provide fast switching capability and fiber amplifiers can compensate for the lossy characteristics of LiNbO$_3$, these types of cross-connects do not provide the necessary wavelength selectivity for effectively managing bandwidth. In another type of optical cross-connect arrangement, wavelength channels are rearranged according to common destinations using wavelength-changing elements. In particular, multi-wavelength optical signals are demultiplexed into individual optical signals of different wavelengths and the individual optical signals are switched using separate layers of spatial switch fabric corresponding to each of the different wavelengths. The use of demultiplexers and separate layers of switch fabric results in this type of cross-connect arrangement being costly and complex to implement. Similarly, other types of optical cross-connect arrangements using multiple stages of switch fabric are also known to be costly and complex to implement.

SUMMARY OF THE INVENTION

Problems of prior cross-connect systems relating to wavelength selectivity and complexity are substantially eliminated and increasing demands for more speed and bandwidth in communication networks can be satisfied according to the principles of the invention with an optical switch that includes an optical router portion for distributing multi-wavelength optical signals received at input ports of the switch, an optical combiner portion for supplying multi-wavelength signals at the output ports of the switch, and optical fibers for interconnecting the optical router portion and optical combiner portion. Selected ones of the interconnecting optical fibers include wavelength-selective elements, such as fiber gratings, which are capable of transmitting or reflecting individual channels within the multi-wavelength optical signals so that a selected channel of a particular wavelength can be routed from any of the input ports to any of the output ports of the switch.

In one exemplary embodiment, the optical router portion includes a plurality of input optical couplers, wherein each input optical coupler is associated with a corresponding input port of the optical switch. Similarly, the optical combiner portion includes a plurality of output optical couplers, wherein each output optical coupler is associated with a corresponding output port of the optical switch. Each input optical coupler together with its associated fiber gratings on the interconnecting optical fibers is used for distributing the signals received via the input ports while each output optical coupler together with its associated fiber gratings is used for combining the signals to be supplied at the output ports of the switch. By controlling the transmissive and reflective operating modes of the fiber gratings, the fiber gratings can be used to facilitate the switching of individual channels of the multi-wavelength optical signals on a wavelength by wavelength basis.

The optical switch according to the principles of the invention does not require optical-to-electrical and electrical-to-optical conversions and, as a result, can realize the speed and bandwidth advantages associated with transmitting information solely in optical form. Moreover, by using tunable fiber gratings to facilitate the switching function, the optical switch has the necessary wavelength selectivity to optimally manage bandwidth at the optical layer, e.g., on a wavelength by wavelength basis. The optical switch according to the principles of the invention is also less costly and less complex than the prior arrangements which require additional elements such as multiplexer/demultiplexers or multiple stages of switch fabric.

BRIEF DESCRIPTION OF THE DRAWING

A more complete understanding of the principles of the invention may be obtained from consideration of the following detailed description in conjunction with the drawing, with like elements referenced with like references, in which:

FIG. 2B is a simplified diagram showing an illustrative example of the operation of the 2×2 wavelength-selective optical switch shown in FIG. 2A;

DETAILED DESCRIPTION OF THE INVENTION

Figure 1:
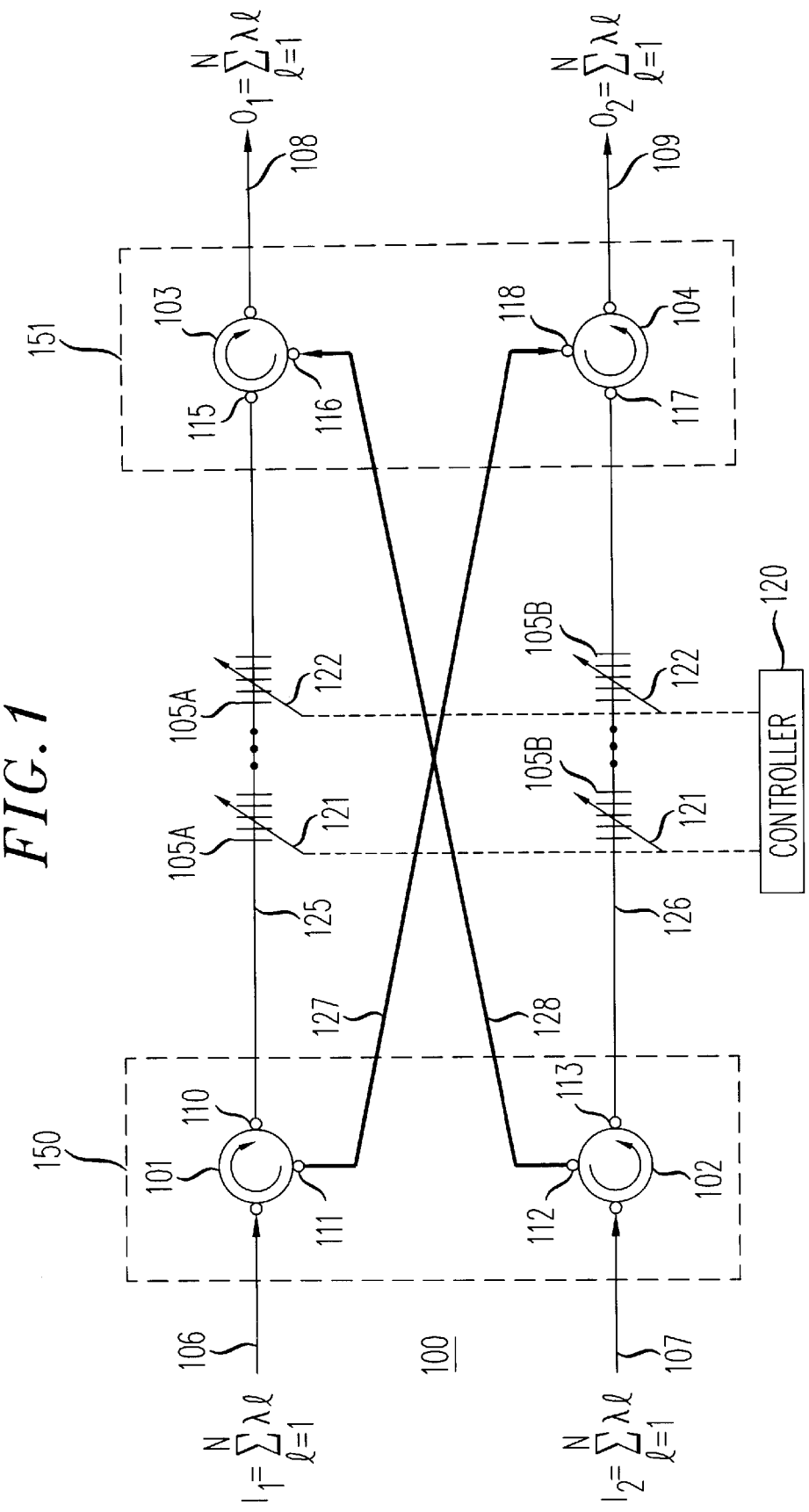
FIG. 1 is an illustrative embodiment of a 2×2 wavelength-selective optical switch according to the principles of the invention.

FIG. 1 shows an exemplary embodiment of a 2×2 optical switch 100 according to the principles of the invention which can switch individual channels of multi-wavelength optical signals such as wavelength division multiplexed (WDM) optical signals. In the example shown in FIG. 1, multi-wavelength signals $I_1$ and $I_2$, represented by $$\sum_{i=1}^{N} \lambda_i,$$

each comprise N individual channels, wherein each individual channel is associated with one of N wavelengths. However, it should be noted that this configuration is only meant to be illustrative. For example, different wavelengths may be assigned to the individual channels of multi-wavelength signals $I_1$ and $I_2$.

Optical switch 100 comprises an optical router portion 150 and an optical combiner portion 151. Optical router portion 150, which includes directional optical transfer devices 101 and 102, distributes multi-wavelength optical input signals $I_1$ and $I_2$. Optical combiner portion 151, which includes directional optical transfer devices 103 and 104, combines multi-wavelength optical signals for output as output signals $O_1$ and $O_2$. More specifically, directional optical transfer devices 101 and 102 receive multi-wavelength optical input signals $I_1$ and $I_2$ via input optical fibers 106 and 107, respectively. Similarly, directional optical transfer devices 103 and 104 are coupled to output optical fibers 108 and 109, respectively, for supplying multi-wavelength optical output signals $O_1$ and $O_2$, respectively. Directional optical transfer devices 101–104 may comprise optical circulators which are well-known in the art or any other known devices capable of transferring or coupling optical energy in a directional manner. For simplicity of explanation, reference will be made hereinafter to optical circulators 101–104.

Optical circulators 101–104 are coupled together via interconnecting optical fibers 125–128, wherein optical fibers 125 and 126 are wavelength-selective optical fibers comprising wavelength-selective elements 105 disposed therein. Wavelength-selective elements 105 may comprise tunable fiber Bragg gratings which are well-known in the art or any other known wavelength-selective filters. For simplicity of explanation, reference will be made hereinafter to fiber gratings 105. As shown, optical fiber 125 includes fiber gratings 105A while optical fiber 126 includes fiber gratings 105B. As shown, port 110 of optical circulator 101 is coupled to port 115 of optical circulator 103 on a straight-through path via wavelength-selective optical fiber 125. Port 111 of optical circulator 101 is coupled to port 118 of optical circulator 104 on a cross-over path via optical fiber 127. Similarly, port 113 of optical circulator 102 is coupled to port 117 of optical circulator 104 on a straight-through path via wavelength-selective optical fiber 126. Port 112 of optical circulator 102 is also coupled to port 116 of optical circulator 103 on a cross-over path via optical fiber 128.

In contrast to prior optical switching and cross-connect systems, optical switch 100 according to the principles of the invention uses tunable fiber gratings to facilitate a wavelength-selective switching function. In particular, fiber gratings 105 can be tuned to reflect or transmit optical channels of any particular wavelength from the multi-wavelength optical input signals $I_1$ and $I_2$. In one example, fiber gratings 105 can be tuned or otherwise programmed so that at least one fiber grating 105 is used for each particular wavelength that is to be routed from an input to an output of optical switch 100. Fiber gratings 105 can operate as either band reflection filters or band pass filters. As band reflection filters, fiber gratings 105 can be used to reflect any particular wavelength or wavelengths in the multi-wavelength optical signal. In contrast, as band pass filters, fiber gratings 105 can be used to pass any particular wavelength or wavelengths.

Methods for adapting fiber gratings using fabrication techniques or other tuning/programming techniques are well known. In the embodiments described herein, fiber gratings 105 can be spliced into the fiber path, etched directly on the fiber, or incorporated by other known methods. For additional background information on the use of fiber gratings as wavelength-selective components, see, for example, Hubner et al., *Strong Bragg Gratings in Non Sensitized Low Loss Planar Waveguides as Building Blocks for WDM Network Components*, SPIE Vol. 2998, No. 12, Photonics West 97, San Jose, Calif., 1997.

In operation, optical switch 100 employs wavelength-selective add/drop principles to perform the equivalent switching function of a traditional cross-bar switch. More specifically, a multi-wavelength optical signal comprising individual channels each having a particular wavelength is provided as input $I_1$ to optical circulator 101 from optical fiber 106. Optical circulator 101 transfers the multi-wavelength optical signal onto wavelength-selective path 125 via port 110 of optical circulator 101. Those individual channels having wavelengths that are in the transmissive band of fiber gratings 105A are transmitted as a "through" connection to port 115 of optical circulator 103 and are supplied as part of multi-wavelength output signal $O_1$. This "through" routing would be the functional equivalent of the bar state of a cross-bar switch. Those wavelength channels having wavelengths that are in the reflection band of fiber gratings 105A are reflected back to port 110 of optical circulator 101. These channels are then routed from port 111 of optical circulator 101 to port 118 of optical circulator 104 via cross-over optical fiber 127 and are supplied as part of multi-wavelength output signal $O_2$. In effect, fiber gratings 105A are used to assist in cross-connecting these reflected channels in the same way that signals are cross-connected in the cross state of a cross-bar switch. The same principles of operation apply to optical signal $I_2$ entering optical circulator 102 and will not be repeated here for reasons of brevity.

As shown, it is contemplated that selected ones of fiber gratings 105 can be controlled to facilitate the appropriate "through" routing and "cross-connect" routing of individual channels within the multi-wavelength optical signals. FIG. 1 shows one possible control implementation whereby fiber gratings 105 are controlled by a single controller 120 using a configuration of ganged switches 121–122. In particular, switch 121 may be used to simultaneously control a fiber grating 105A from optical fiber 125 and a fiber grating 105B from optical fiber 126, while switch 122 may be used to simultaneously control another fiber grating 105A from optical fiber 125 and another fiber grating 105B from optical fiber 126, and so on. In the example where the same wavelengths may be used for channels in both multi-wavelength optical signals $I_1$ and $I_2$, the control scheme could be advantageously used to ensure that corresponding wavelength channels carried in each optical fiber are synchronously switched to avoid interference between any two channels having the same wavelength in the same optical fiber.

Other known control arrangements for controlling the operation of fiber gratings 105 will be apparent to those skilled in the art and are also contemplated by the teachings of the invention. For example, tunable fiber gratings 105 may be individually addressed and then controlled as appropriate (i.e., individually controllable). Appropriate control measures may include each fiber grating being individually tuned (or programmed) or individually and selectively switched between its transmissive and reflective operational states (e.g., to achieve an ON/OFF effect) using techniques well known to those skilled in the art. Accordingly, these and other well-known control techniques for fiber gratings are contemplated by the teachings of the invention.

In sum, fiber gratings 105 disposed along interconnecting optical fibers 125–128 between optical router portion 150 and optical combiner portion 151 facilitate a switching function on a wavelength by wavelength basis. More specifically, routing of individual channels of the multi-wavelength optical signals is controlled along the interconnecting optical fibers 125–128 based on whether fiber gratings 105 are in a transmissive mode (i.e., the channel of a particular wavelength will be transmitted through the grating) or in a reflective mode (i.e., the channel of a particular wavelength will be reflected back).

Figure 2A:
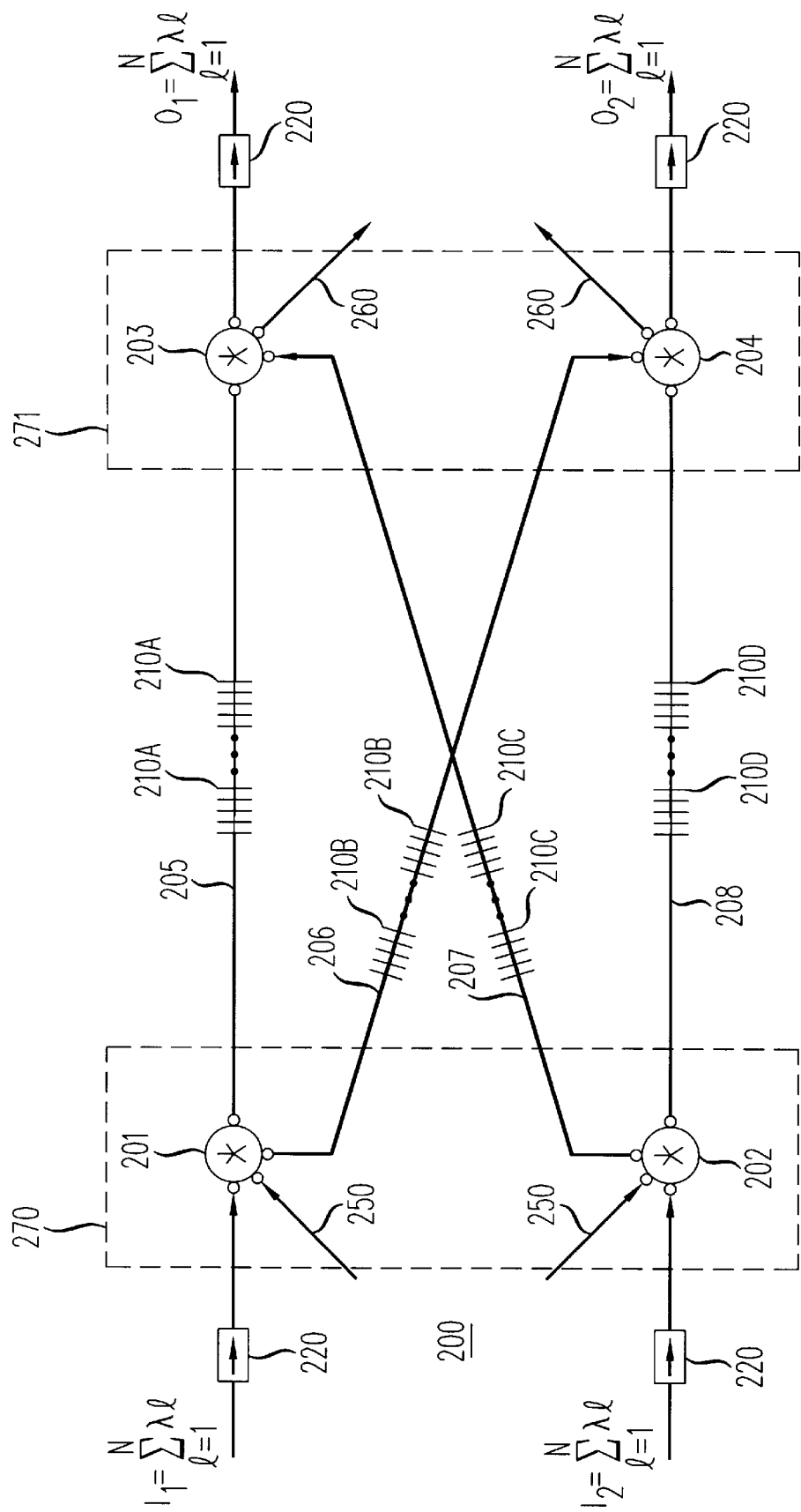
FIG. 2A is another illustrative embodiment of a 2×2 wavelength-selective optical switch according to the principles of the invention.

FIG. 2A shows another exemplary embodiment of a 2×2 optical switch 200 according to the principles of the invention. Similar to the embodiment shown in FIG. 1, optical switch 200 comprises an optical router portion 270 and an optical combiner portion 271. Optical router portion 270, which includes optical couplers 201 and 202 distributes multi-wavelength optical input signals $I_1$ and $I_2$. Optical combiner portion 271, which includes optical couplers 203 and 204, combines multi-wavelength optical signals for output as output signals $O_1$ and $O_2$. More specifically, optical couplers 201 and 202 receive multi-wavelength optical input signals $I_1$ and $I_2$, respectively, and optical couplers 203 and 204 supply multi-wavelength optical output signals $O_1$ and $O_2$, respectively. Optical couplers 201–204 may comprise passive optical couplers, such as passive star couplers, which are well-known in the art or any other known devices capable of coupling optical energy. For simplicity of explanation, reference will be made hereinafter to star couplers 201–204.

Star couplers 201–204 are coupled together via interconnecting optical fibers 205–208, which are wavelength-selective optical fibers comprising wavelength-selective elements 210 disposed therein. Wavelength-selective elements 210 may comprise tunable fiber Bragg gratings which are well-known in the art or any other known wavelength-selective filters. For simplicity of explanation, reference will be made hereinafter to fiber gratings 210. As shown, optical fiber 205 includes fiber gratings 210A, optical fiber 206 includes fiber gratings 210B, optical fiber 207 includes fiber gratings 210C, and optical fiber 208 includes fiber gratings 210D. As shown, star coupler 201 is coupled to star coupler 203 on a straight-through path via wavelength-selective optical fiber 205. Star coupler 201 is coupled to star coupler 204 on a cross-over path via wavelength-selective optical fiber 206. Similarly, star coupler 202 is coupled to star coupler 204 on a straight-through path via wavelength-selective optical fiber 208. Star coupler 202 is also coupled to star coupler 203 on a cross-over path via wavelength-selective optical fiber 207.

As shown in FIG. 2A, optional optical isolators 220 can also be coupled to selected input and output ports of the star couplers in order to protect against backscattering or reflection of the optical signals which could, for example, damage certain components. Accordingly, optional isolators 220 can be used to reduce interference from unwanted reflections (e.g., counter-propagating signals).

In the exemplary embodiment in FIG. 2A, star couplers 201 and 202 are 1×2 couplers whereby an optical signal received as input is broadcast to all outputs. Star couplers 203 and 204 are 2×1 couplers whereby a single output is formed by combining all inputs. The operation of star couplers are well known. For example, it is well known that a 1×M optical coupler will equally broadcast a single input, such as a multi-wavelength optical signal, onto each of its M output ports. Although the embodiment shown in FIG. 2A uses 1×2 and 2×1 star couplers, it should be noted that the principles of the invention may be applied with any size star coupler. Accordingly, the embodiments shown and described herein are meant to be illustrative and not limiting. For example, as will be described below in more detail, any size cross-connect can be realized using a basic two stage cross-connect architecture according to the principles of the invention, wherein optical router portion 270 represents one stage (for routing signals) and optical combiner portion 271 represent another stage (for combining signals). As a result, this architecture is less complex and less costly than prior arrangements which require multiple stages of switch fabric.

Referring again to FIG. 2A, each output port of star coupler 201 will carry a portion of the optical energy of the entire multi-wavelength optical signal $I_1$ (i.e., all wavelengths $\lambda_1$ to $\lambda_N$), and each output port of star coupler 202 will carry a portion of the optical energy of the entire multi-wavelength optical signal $I_2$ (i.e., all wavelengths $\lambda_1$ to $\lambda_N$). Multi-wavelength optical input signal $I_1$ will therefore be broadcast onto both wavelength-selective optical fibers 205 and 206 via star coupler 201, and input signal $I_2$ will be broadcast onto both wavelength-selective optical fibers 207 and 208 via star coupler 202.

Because the entire multi-wavelength signal is broadcast on all outputs of the corresponding star coupler, fiber gratings 210 are disposed in all of the wavelength-selective optical fibers that interconnect star couplers 201–204. The fiber gratings 210 are required in each path so that selected channels of particular wavelengths can be transmitted or reflected as appropriate in the interconnecting optical fibers 205–208 between the star couplers 201–204. In the particular embodiment shown in FIG. 2A, fiber gratings 210 could operate as band pass filters which would be tuned to pass selected channels of particular wavelengths from the multi-wavelength optical signals $I_1$ and $I_2$. For example, fiber gratings 210A could be tuned to pass only selected wavelengths from star coupler 201 to star coupler 203. Similarly, fiber gratings 210B could be tuned to pass other selected wavelengths from star couplers 201 to 204. Fiber gratings 210C and 210D are also tuned accordingly to pass selected wavelengths as desired.

In operation, optical switch 200 differs from optical switch 100 (FIG. 1) in that star couplers are used as opposed to optical circulators. More specifically, a multi-wavelength optical signal comprising individual channels each having a particular wavelength is provided as input $I_1$ to star coupler 201 in optical router portion 270. Star coupler 201 broadcasts or routes the entire multi-wavelength optical signal (i.e., all channels having wavelengths $\lambda_1$ to $\lambda_N$) onto wavelength-selective optical fibers 205 and 206. Those individual channels having wavelengths that are in the transmissive band of fiber gratings 210A are transmitted as a "through" connection to star coupler 203. This "through" routing would be the functional equivalent of the bar state of a cross-bar switch. Those wavelength channels having wavelengths that are in the reflection band of fiber gratings 210A are reflected back to star coupler 201. Similarly, those individual channels having wavelengths that are in the transmissive band of fiber gratings 210B are transmitted via wavelength-selective optical fiber 206 to star coupler 204. This cross-connection routing between star couplers 201 and 204 would be the functional equivalent of the cross state of a cross-bar switch. Those channels having wavelengths that are in the reflection band of fiber gratings 210B are reflected back to star coupler 201. The same principles of operation apply to optical signal I$_2$ entering star coupler 202 and will not be repeated here for reasons of brevity.

In optical combiner portion 271, star coupler 203 receives individual channels of particular wavelengths that are routed on the "through" path along optical fiber 205 from star coupler 201. Star coupler 203 also receives individual channels of particular wavelengths that are routed on the "cross-connection" path along optical fiber 207 from star coupler 202. Star coupler 203 combines the individual channels of different wavelengths from all its inputs and supplies a combined multi-wavelength optical signal as output O$_1$. The same principles of operation apply to star coupler 204 and will not be repeated here for reasons of brevity. In effect, output signal O$_1$ may include individual channels from input signal I$_1$ ("through" channels) as well as individual channels from input signal I$_2$ ("cross-connect" channels).

FIG. 2B shows a simplified diagram of a specific example of the operation of optical switch 200 in which multi-wavelength optical signal I$_1$ includes two individual channels (wavelengths $\lambda_1$ and $\lambda_2$) and multi-wavelength optical signal I$_2$ includes two individual channels (wavelengths $\lambda_3$ and $\lambda_4$). As shown, assume a cross-connect scenario in which it is desirable for output signal O$_1$ to include wavelength channels $\lambda_1$ and $\lambda_3$ and output signal O$_2$ to include wavelength channels $\lambda_2$ and $\lambda_4$. Accordingly, optical switch 200 (FIG. 2A) would be configured so that fiber grating 210A would be transmissive with respect to $\lambda_1$ and reflective with respect to $\lambda_2$. Fiber grating 210B would be transmissive with respect to $\lambda_2$ and reflective with respect to $\lambda_1$. Similarly, fiber grating 210C would be transmissive with respect to $\lambda_3$ and reflective with respect to $\lambda_4$ and fiber grating 210D would be transmissive with respect to $\lambda_4$ and reflective with respect to $\lambda_3$. It should be noted that this example illustrates that the wavelength assignments for the individual channels in the various input and output signals (e.g., I$_1$, I$_2$, O$_1$, and O$_2$) are not necessarily the same even though each is represented by $$\sum_{l=1}^{N} \lambda_l$$

for simplicity of explanation.

In view of the foregoing description, fiber gratings 210A–210D are used to facilitate routing (e.g., broadcasting, distributing, etc.) of individual wavelength channels within multi-wavelength optical signals in conjunction with optical router portion 270. The same fiber gratings 210A–210D are also used to facilitate combining (e.g., multiplexing, coupling, etc.) of individual wavelength channels within multi-wavelength optical signals in conjunction with optical combiner portion 271. By including tunable fiber gratings 210 within each of wavelength-selective optical fibers 205–208 that interconnect star couplers 201–204, optical switch 200 therefore provides a very flexible wavelength-selective cross-connect capability.

According to another aspect of the invention, FIG. 2A illustrates the use of previously unused ports on star couplers 201–204 to provide a wavelength-selective local add/drop capability. As shown, previously unused input ports 250 can be used on star couplers 201 and 202 for adding individual channels of particular wavelengths to the multi-wavelength optical signals. Similarly, previously unused output ports 260 can be used on star couplers 203 and 204 for dropping selected individual channels having a particular wavelength from the multi-wavelength optical signals.

In operation, a drop function using star couplers according to the embodiment shown in FIG. 2A may require additional components, such as filters or other wavelength-selective elements, to filter out the desired wavelength channel to be dropped. For example, a wavelength-selective filter that is only transmissive for $\lambda_1$ would be needed in drop path 260 in order to drop only wavelength channel $\lambda_1$ from the multi-wavelength optical signal. It should also be noted that the add/drop configuration shown in FIG. 2A is only meant to be illustrative. As such, those skilled in the art will understand that any combination of available ports on star couplers 201–204 may be used for add or drop paths as desired. By way of example only, star couplers 201 and 202 may also support a drop function depending on the availability of ports.

By taking advantage of the design flexibility of star couplers and the wavelength-selectivity capabilities of fiber gratings, a programmable add/drop capability can be extended without changing the basic switch fabric. In particular, the add/drop capability is extensible in that star couplers can be designed with additional ports for later use and programmable in that fiber gratings can be tuned or programmed accordingly to drop or add selected wavelength channels.

Figure 3:
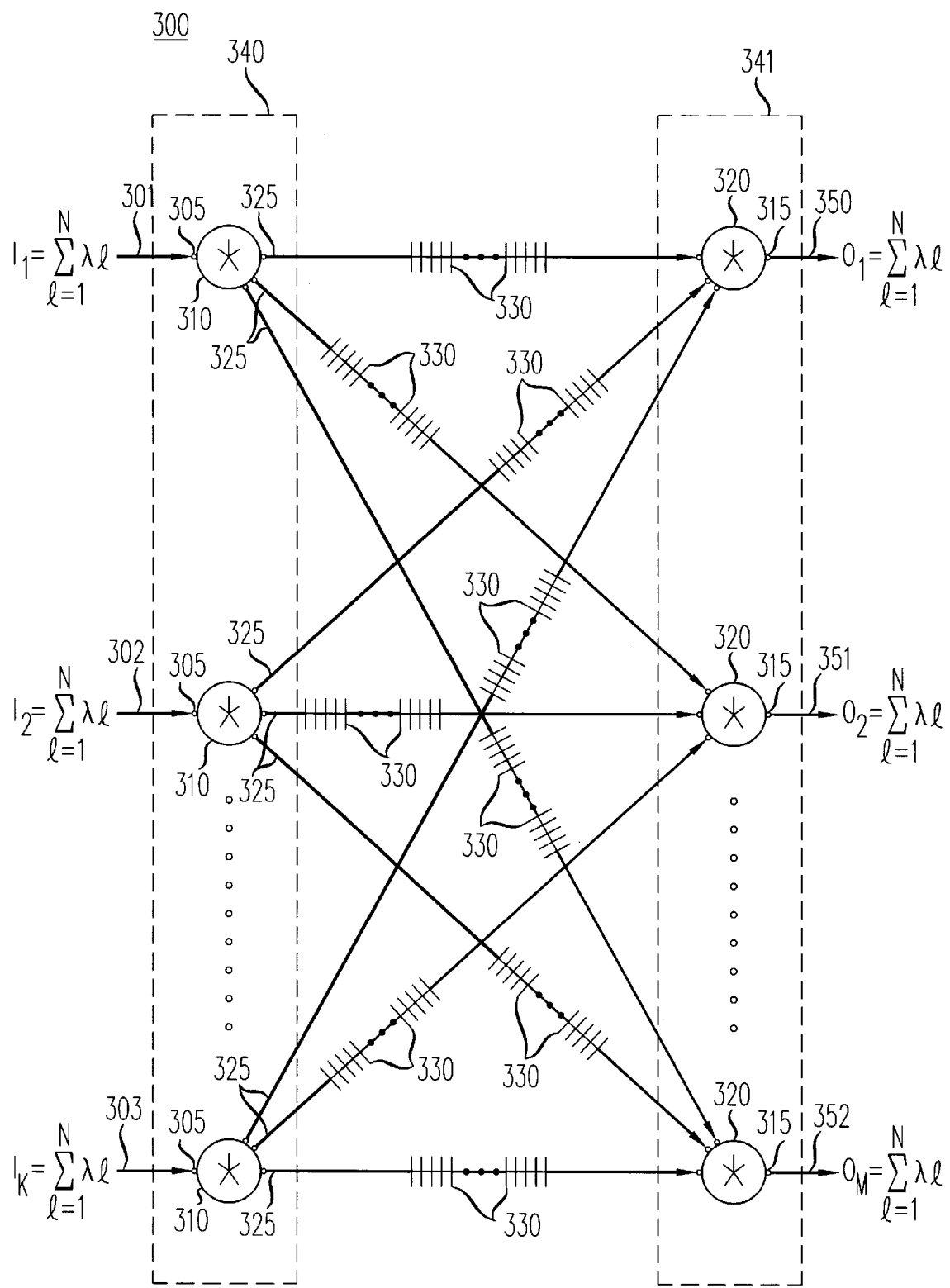
FIG. 3 is an illustrative embodiment of a K×M wavelength-selective optical cross-connect arrangement according to the principles of the invention.

FIG. 3 shows K×M optical cross-connect arrangement 300. With the exceptions noted below, the principles of operation previously described for 2×2 optical switch 200 (FIG. 2A) apply equally to K×M optical cross-connect arrangement 300 described herein.

Briefly, optical cross-connect arrangement 300 receives K multi-wavelength optical signals each having individual channels of different wavelengths as inputs, routes the individual channels of the multi-wavelength optical signals between K cross-connect inputs and M cross-connect outputs, and supplies M multi-wavelength optical signals as outputs. Optical cross-connect arrangement 300 comprises an optical router portion 340 and an optical combiner portion 341. Optical router portion 340, which includes optical couplers 310, broadcasts multi-wavelength optical signals I$_1$, I$_2$ through I$_K$ received at K cross-connect input ports 305. Optical combiner portion 341, which includes optical couplers 320, combines multi-wavelength optical signals and supplies these as outputs O$_1$, O$_2$ through O$_M$ at M cross-connect output ports 315. Fiber gratings 330 are provided along interconnecting optical fibers 325 to facilitate the routing of the individual channels of the multi-wavelength optical signals between optical router portion 340 and optical combiner portion 341.

For simplicity of illustration in FIG. 3, only inputs I$_1$, I$_2$, and I$_K$ and outputs O$_1$, O$_2$, and O$_M$ are shown while inputs I$_3$ through I$_{K-1}$ and outputs O$_3$ through O$_{M-1}$ have been omitted. Furthermore, each input and output signal is shown for simplicity of explanation to include the same wavelength set, represented by $$\sum_{l=1}^{N} \lambda_l,$$

but could easily be different wavelength sets.

K cross-connect input ports 305 are coupled to input optical fibers 301–303 for receiving multi-wavelength optical input signals $I_1$, $I_2$, through $I_K$. An input optical coupler 310, shown here as a 1×M star coupler having one input port and M output ports, is associated with each of cross-connect input ports 305 in optical router portion 340. Each input optical coupler 310 is capable of broadcasting the multi-wavelength optical signal from its single input port to its M output ports. In the optical combiner portion 341 of optical cross-connect arrangement 300, a plurality of cross-connect output ports 315 are coupled to output optical fibers 350–352 that carry the routed multi-wavelength optical signals. An output optical coupler 320, shown here as a K×1 star coupler having K input ports and a single output port, is associated with each of cross-connect output ports 315. Each output optical coupler 320 is capable of combining the individual wavelength channels received at all its input ports.

Input optical couplers 310 and output optical couplers 320 are coupled together via interconnecting wavelength-selective optical fibers 325. Wavelength-selective optical fibers 325 include wavelength-selective elements 330, such as tunable fiber gratings, for transmitting or reflecting any of the individual wavelength channels in the multi-wavelength optical signals in the same manner previously described for the other embodiments. Interconnecting wavelength-selective optical fibers 325 provide a fully connective switch fabric which allows for any of the N wavelength channels from any multi-wavelength optical input signals $I_1$, $I_2$, through $I_K$ to be routed to any of the cross-connect output ports 315 on a non-blocking basis.

In a similar manner as described for the previous embodiments, fiber gratings 330 are used to facilitate routing (e.g., broadcasting, distributing, etc.) of individual wavelength channels within multi-wavelength optical signals in conjunction with optical router portion 340. The same fiber gratings 330 are also used to facilitate the combination (e.g., multiplexing, coupling, etc.) of individual wavelength channels within multi-wavelength optical signals in conjunction with optical combiner portion 341. By including tunable fiber gratings 330 within each of wavelength-selective optical fibers 325 that interconnect optical couplers 310 and 320, optical cross-connect arrangement 300 therefore provides a very flexible wavelength-selective cross-connect capability.

As illustrated in FIG. 3 for the K×M switch fabric, there are K·M wavelength-selective optical fibers 325 interconnecting optical router portion 340 and optical combiner portion 341, where K represents the number of cross-connect input ports 305 and M represents the number of cross-connect output ports 315. When K=M, FIG. 3 shows a symmetric switch having an equal number of input and output ports. Consequently, for a 3×3 cross-connect based on the arrangement in FIG. 3, there will be 3 wavelength-selective optical fibers 325 between each input optical coupler 310 and each output optical coupler 320 for a total of 9 wavelength-selective optical fibers. However, it should be noted that any size cross-connect arrangement, whether a square switch matrix with K=M or a non-square switch matrix with K≠M, may be used to realize the present invention. Importantly, the embodiment shown in FIG. 3 illustrates how any size cross-connect can be realized using the basic two stage cross-connect architecture according to the principles of the invention, wherein optical router portion 340 represents one stage (for receiving and routing K multi-wavelength optical input signals) and optical combiner portion 341 represent another stage (for combining and supplying M multi-wavelength optical output signals). As indicated, this cross-connect architecture is less costly and less complex than prior arrangements which use multiple stages of switch fabric for routing signals.

The number of tunable fiber gratings 330 may also vary according to the size of the cross-connect arrangement as well as the particular fiber grating design implementation. For example, a separate tunable fiber grating 330 may be used for each of the N wavelengths or a single tunable fiber grating 330 may be used to pass or reflect more than one of the N wavelengths. Additionally, wavelength-selective optical fibers 325 may include other fiber gratings for other purposes, such as gain flattening, for example. Using the example where each tunable fiber grating 330 corresponds to one of the N wavelength channels, the number of fiber gratings 330 needed to carry out switching of the individual channels of multi-wavelength optical signals having N wavelength channels is K·M·N. For example, in a 4 wavelength system using a 3×3 cross-connect, i.e., K=M=3 and N=4, there will be 3 wavelength-selective optical fibers 325 between each input optical coupler 310 and each output optical coupler 320 for a total of 9 wavelength-selective optical fibers. Because each path must be capable of reflecting/passing each of the 4 wavelengths, 36 fiber gratings are required. Again, other modifications or variations of the embodiment described above are possible without departing from the spirit and scope of the present invention.

If the cross-connect switch fabric is large, i.e., if K·M is large, amplification may be needed to compensate for insertion and other losses that may occur as signals are broadcast and combined by the optical couplers. Many different amplifier schemes may be employed in conjunction with the teachings of the present invention. For example, various semiconductor optical amplifiers and fiber optical amplifiers can be used. The use of fiber amplifiers, and specifically erbium-doped fiber amplifiers, is well-known in the art and will be used in the examples described below. It should be noted that although erbium-doped fiber amplifiers are particularly well-suited to provide amplification in the present invention, and will be described herein, other suitable rare-earth elements may also be used, such as praseodymium, neodymium, and the like.

According to the principles of the invention, optical fiber amplification may be incorporated using a number of different configurations. For example, fiber optical amplifiers (not shown) may be placed before input optical couplers 310 in optical router portion 340 or after output optical couplers 320 in optical combiner portion 341. Alternatively, fiber optical amplifiers (not shown) may be distributed within the wavelength-selective optical fibers 325 in a similar manner as that described in our co-pending U.S. application Ser. No. 08/777,890, filed Dec. 31, 1996 now U.S. Pat. No. 5,959, 767, which is herein incorporated by reference. In yet another configuration, fiber optical amplifiers (not shown) may be judiciously integrated with the tunable fiber gratings 330 along wavelength-selective optical fibers 325 as described in our co-pending U.S. applications, Ser. Nos. 08/920,390 and 08/920,391, both filed on Aug. 29, 1997, both of which are herein incorporated by reference.

Although not explicitly shown in FIGS. 2 and 3, it is contemplated that selected ones of fiber gratings 210 and 330, respectively, can be controlled to facilitate the appropriate "through" routing and "cross-connect" routing of individual channels within the multi-wavelength optical signals. Accordingly, the various control techniques previously described for FIG. 1 apply equally to the embodiments shown in FIGS. 2 and 3.

Figure 4A:
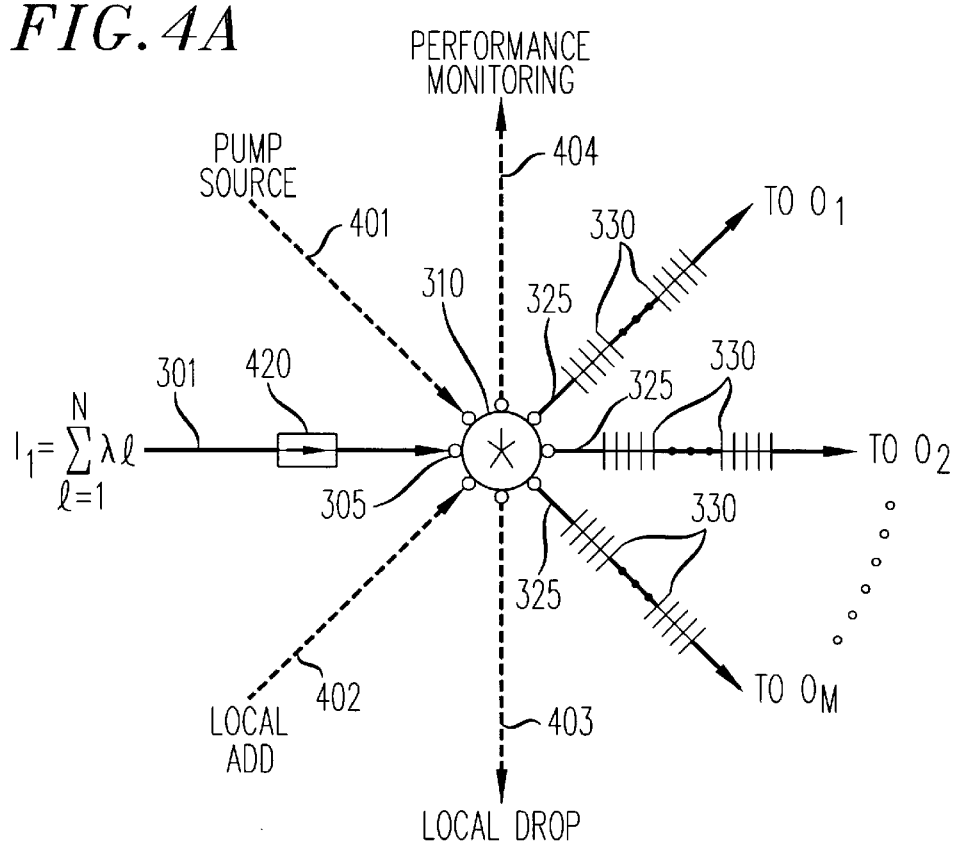
FIG. 4A shows the 1×M wavelength-selective optical router portion of the K×M wavelength-selective cross-connect arrangement of FIG. 3.

FIG. 4A shows one of the input optical couplers 310 from optical router portion 340 of optical cross-connect arrangement 300 (FIG. 3). The configuration in FIG. 4A essentially represents a 1×M wavelength-selective optical distributor which is a basic building block for the K×M wavelength-selective cross-connect arrangement. As previously described, each input optical coupler 310 is typically configured as a 1×M optical coupler, such as a passive star coupler, in which a single input signal is broadcast among M outputs. In practice, a 1×M optical coupler, such as a 1×M star coupler, is typically fabricated by fusing together M optical couplers so that there are M inputs and M outputs. In effect, a 1×M optical coupler is essentially an M×M optical coupler. As such, a 1×M optical coupler will have the same loss and approximate implementation cost of an M×M coupler. However, in operation, only one of the inputs of the 1×M coupler is used to receive an input signal that is then broadcast to M outputs.

Building on this example, FIG. 4A shows how previously unused ports can be used in optical coupler 310 to provide additional functionality. In addition to cross-connect input port 305 that receives the multi-wavelength optical signal via input optical fiber 301, a previously unused input port 401 may be used to supply the pump light from a pump source (not shown) for a fiber optical amplifier (not shown). Also, another previously unused input port 402 may be used as a local add port for adding wavelength channels to the multi-wavelength optical signal. In addition to the output ports that are used for broadcasting the multi-wavelength optical signals via wavelength-selective optical fibers 325, previously unused output ports may also be used as local drop ports 403 for dropping individual wavelength channels, or as access ports 404 for performance monitoring applications and the like. Optional isolator 420 is also shown for those applications which require protection against back reflections as previously described.

Figure 4B:
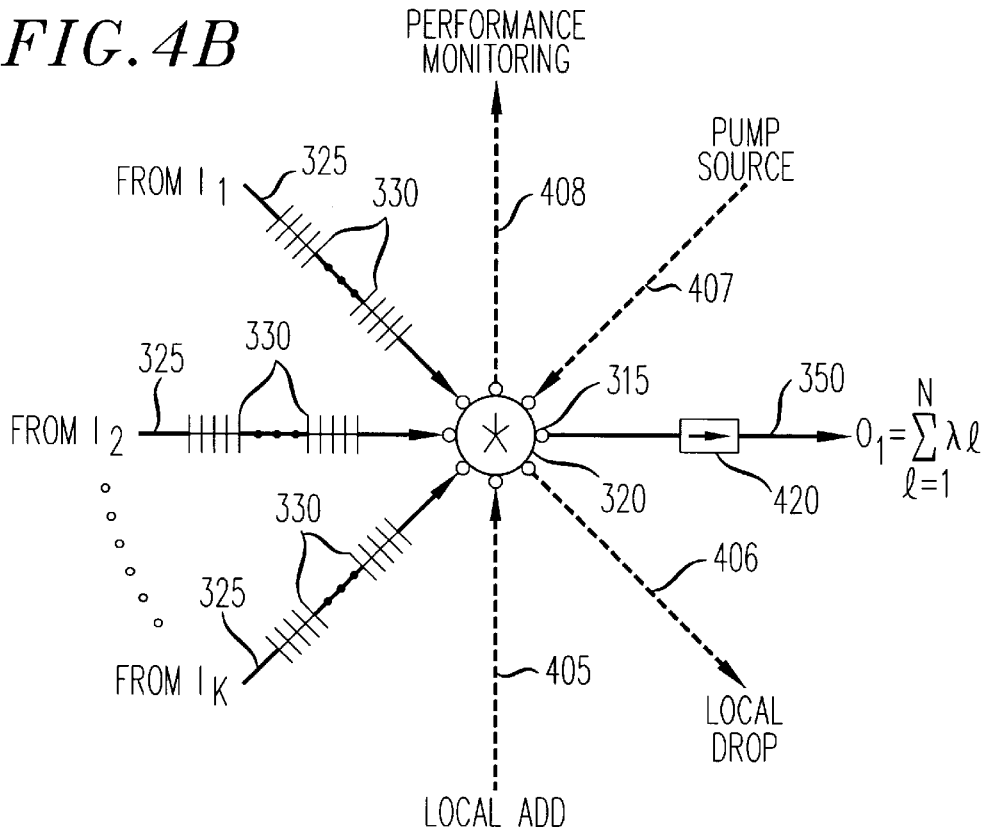
FIG. 4B depicts the K×1 wavelength-selective optical combiner portion of the K×M wavelength-selective cross-connect arrangement of FIG. 3.

Similarly, FIG. 4B shows one of the output optical couplers 320 from optical combiner portion 341 of optical cross-connect arrangement 300 (FIG. 3). This configuration in FIG. 4B essentially represents a K×1 wavelength-selective optical combiner which is the other essential building block of the K×M cross-connect arrangement. As previously described, each output optical coupler 320 is typically configured as a K×1 optical coupler, such as a passive star coupler, in which a single output is combined from K input signals. As shown, previously unused input and output ports on output optical coupler 320 can be used to provide additional capability in the same manner as that previously described for input optical coupler 310 in FIG. 4A. For example, optical coupler 320 may include a local add port 405, a local drop port 406, a port 407 for pump light, and a performance monitoring port 408.

In sum, the wavelength-selective optical cross-connect arrangement according to the principles of the invention has considerable design flexibility in terms of being able to support multi-wavelength systems of any size (i.e., any number of wavelengths and any number of inputs and outputs) as well as being able to accommodate additional service requirements without significant changes to the switch fabric. As previously described, the cross-connect arrangement also supports an extensible add/drop capability that can be dynamically tailored depending on the add/drop requirements. The cross-connect arrangement is also useful in both drop and continue applications as well as in broadcasting applications.

It will be understood that the particular embodiments described above are only illustrative of the principles of the invention, and that various modifications could be made by those skilled in the art without departing from the spirit and scope of the invention. For example, it should be noted that there are several suitable material systems that can be used for implementing the preceding embodiments including, but not limited to, lithium niobate, silicon optical bench, semiconductor systems, and the like. Because these examples are illustrative and not limiting, various modifications to the embodiments are contemplated by the teachings of the invention. Accordingly, the scope of the present invention is limited only by the claims that follow.

What is claimed is:

1. An optical switch including a plurality of input ports for receiving multi-wavelength optical signals and a plurality of output ports for supplying multi-wavelength optical signals as outputs from the optical switch, each multi-wavelength optical signal including a plurality of channels wherein a channel is associated with a particular wavelength, the optical switch further comprising:

an optical router portion coupled to the plurality of input ports for distributing the multi-wavelength optical signals from the input ports, the optical router portion including a plurality of input optical couplers, each input optical coupler associated with a corresponding one of the plurality of input ports;

an optical combiner portion coupled to the plurality of output ports for combining the multi-wavelength optical signals, the optical combiner portion including a plurality of output optical couplers, each output optical coupler associated with a corresponding one of the plurality of output ports; and a plurality of optical fibers interconnecting the optical router portion and the optical combiner portion, selected ones of the plurality of optical fibers including wavelength-selective elements capable of passing or reflecting any of the plurality of channels so that any of the plurality of channels can be supplied from any of the plurality of input ports to any of the plurality of output ports, wherein individual channels of particular wavelengths are selectively added and dropped from selected unused ports of the plurality of input optical couplers and the plurality of output optical couplers.

2. An optical switch including a plurality of input ports for receiving multi-wavelength optical signals and a plurality of output ports for supplying multi-wavelength optical signals as outputs from the optical switch, each multi-wavelength optical signal including a plurality of channels wherein a channel is associated with a particular wavelength, the optical switch further comprising:

an optical router portion coupled to the plurality of input ports for distributing the multi-wavelength optical signals from the input ports, the optical router portion including a plurality of input optical couplers, each input optical coupler associated with a corresponding one of the plurality of input ports;

an optical combiner portion coupled to the plurality of output ports for combining the multi-wavelength optical signals, the optical combiner portion including a plurality of output optical couplers, each output optical coupler associated with a corresponding one of the plurality of output ports;

a plurality of optical fibers interconnecting the optical router portion and the optical combiner portion, selected ones of the plurality of optical fibers including wavelength-selective elements capable of passing or reflecting any of the plurality of channels so that any of the plurality of channels can be supplied from any of the plurality of input ports to any of the plurality of output ports; and a rare earth-doped fiber amplifier coupled to each of the plurality of input optical couplers for optically amplifying the multi-wavelength optical signal received by the corresponding one of the plurality of input optical couplers.

3. The optical switch according to claim 2, wherein the wavelength-selective elements comprise fiber gratings.

4. The optical switch according to claim 3, further comprising a controller responsive to command signals for selectively controlling the fiber gratings to reflect or pass any of the plurality of channels.

5. The optical switch according to claim 4, wherein the fiber gratings are tunable fiber gratings and wherein the controller selectively tunes the fiber gratings.

6. The optical switch according to claim 4, wherein the controller selectively switches the fiber gratings between a transmissive and a reflective operational state.

7. The optical switch according to claim 4, wherein selected ones of the fiber gratings are controlled as a group in a ganged arrangement.

8. The optical switch according to claim 4, wherein each of the fiber gratings is individually controllable.

9. The optical switch according to claim 2, wherein each of the plurality of input optical couplers is a 1×M optical coupler and each of the plurality of output optical couplers is a K×1 optical coupler, where K is an integer corresponding to the number of input ports and M is an integer corresponding to the number of output ports, wherein each multi-wavelength optical signal comprises N channels, and wherein the multi-wavelength optical signals having N channels are routed between the K input ports and the M output ports in a K×M cross-connect configuration.

10. The optical switch according to claim 9, wherein K=M.

11. The optical switch according to claim 2, wherein the plurality of input optical couplers and the plurality of output optical couplers comprise star couplers.

12. An optical switch including a plurality of input ports for receiving multi-wavelength optical signals and a plurality of output ports for supplying multi-wavelength optical signals as outputs from the optical switch, each multi-wavelength optical signal including a plurality of channels wherein a channel is associated with a particular wavelength, the optical switch further comprising:
  an optical router portion coupled to the plurality of input ports for distributing the multi-wavelength optical signals from the input ports, the optical router portion including a plurality of input optical couplers, each input optical coupler associated with a corresponding one of the plurality of input ports;
  an optical combiner portion coupled to the plurality of output ports for combining the multi-wavelength optical signals, the optical combiner portion including a plurality of output optical couplers, each output optical coupler associated with a corresponding one of the plurality of output ports;
  a plurality of optical fibers interconnecting the optical router portion and the optical combiner portion, selected ones of the plurality of optical fibers including wavelength-selective elements capable of passing or reflecting any of the plurality of channels so that any of the plurality of channels can be supplied from any of the plurality of input ports to any of the plurality of output ports; and
  a rare earth-doped fiber amplifier coupled to each of the plurality of output optical couplers for optically amplifying the multi-wavelength optical signal supplied by the corresponding one of the plurality of output optical couplers.

13. An optical cross-connect comprising:
  at least two input optical circulators each capable of receiving multi-wavelength optical signals, each multi-wavelength optical signal including a plurality of channels wherein a channel is associated with a particular wavelength;
  at least two output optical circulators each capable of supplying the multi-wavelength optical signals as outputs from the optical cross-connect; and
  a plurality of optical fibers interconnecting the at least two input optical circulators and the at least two output optical circulators, selected ones of the plurality of optical fibers including at least one wavelength-selective element capable of passing or reflecting any of the plurality of channels so that any of the plurality of channels can be routed from any of the at least two input optical circulators to any of the at least two output optical circulators.

14. An optical switch including a plurality of input ports for receiving multi-wavelength optical signals and a plurality of output ports for supplying multi-wavelength optical signals as outputs from the optical switch, each multi-wavelength optical signal including a plurality of channels wherein a channel is associated with a particular wavelength, the optical switch further comprising:
  an optical router portion coupled to the plurality of input ports for distributing the multi-wavelength optical signals from the input ports, the optical router portion including a plurality of input optical couplers, each input optical coupler associated with a corresponding one of the plurality of input ports;
  an optical combiner portion coupled to the plurality of output ports for combining the multi-wavelength optical signals, the optical combiner portion including a plurality of output optical couplers, each output optical coupler associated with a corresponding one of the plurality of output ports;
  a plurality of optical fibers interconnecting the optical router portion and the optical combiner portion, selected ones of the plurality of optical fibers including wavelength-selective elements capable of passing or reflecting any of the plurality of channels so that any of the plurality of channels can be supplied from any of the plurality of input ports to any of the plurality of output ports; and
  a corresponding rare earth-doped fiber amplifier coupled within the selected ones of the plurality of optical fibers having wavelength-selective elements, each of the rare earth-doped fiber amplifiers for optically amplifying the multi-wavelength optical signals between the plurality of input optical couplers and the plurality of output optical couplers.

15. The optical switch according to claim 14, further comprising a pump light source operable to pump one or more of the rare earth-doped fiber amplifiers, wherein the pump light source is coupled to an available port on at least one of the plurality of input optical couplers for emitting pump light in a same direction as the multi-wavelength optical signals.

16. The optical switch according to claim 14, further comprising a pump light source operable to pump one or more of the rare earth-doped fiber amplifiers, wherein the pump light source is coupled to an available port on at least one of the plurality of output optical couplers for emitting pump light in an opposite direction as the multi-wavelength optical signals.

* * * * *